(12) United States Patent  
Ashworth

(10) Patent No.: US 7,913,925 B2  
(45) Date of Patent: Mar. 29, 2011

(54) COLOR CHANGING THERMOSTATIC CONTROLLER

(75) Inventor: Nicholas Ashworth, Dublin, OH (US)

(73) Assignee: Ranco Incorporated of Delaware, Carol Stream, IL (US)

( * ) Notice: Subject to any disclaimer, the term of this patent is extended or adjusted under 35 U.S.C. 154(b) by 413 days.

(21) Appl. No.: 10/897,909

(22) Filed: Jul. 23, 2004

(65) Prior Publication Data

US 2006/0016898 A1  Jan. 26, 2006

(51) Int. Cl.
| | | |
|---|---|---|
| *F24F 11/053* | (2006.01) | |
| *G05D 23/12* | (2006.01) | |
| *G05D 23/00* | (2006.01) | |
| *G01K 13/00* | (2006.01) | |

(52) U.S. Cl. .............. 236/1 C; 236/94; 62/130

(58) Field of Classification Search ............ 62/130, 62/125, 126, 127, 129; 236/94, 1 C; 165/11.1  
See application file for complete search history.

(56) References Cited

U.S. PATENT DOCUMENTS

| 5,343,712 A * | 9/1994 | Gowan ..................... 62/126 |
| 6,164,374 A | 12/2000 | Rhodes et al. |
| 6,726,112 B1 * | 4/2004 | Ho ......................... 236/94 |
| 2003/0177012 A1 | 9/2003 | Drennan |

FOREIGN PATENT DOCUMENTS

| JP | 59145615 A * | 8/1984 |
| JP | 2002251903 A * | 9/2002 |

* cited by examiner

*Primary Examiner* — Chen-Wen Jiang  
(74) *Attorney, Agent, or Firm* — Reinhart Boerner Van Deuren P.C.

(57) ABSTRACT

An apparatus and method are provided for visually displaying the present room temperature of a space, through the use of a thermostatic controller adapted for receiving a temperature input indicative of a temperature in a space, and having a housing that includes an illuminated portion thereof emitting a light having a characteristic of the light that changes as a function of the temperature in the space. In various forms of the invention characteristics of the light, such as the color or the intensity of the light, are changed as a function of the temperature in the space, to provide a visual indication indicative of the present room temperature of the space. The characteristic of the light may be changed as a function of the present room temperature, or as the difference between the present room temperature and a desired room temperature, or for other purposes.

3 Claims, 2 Drawing Sheets

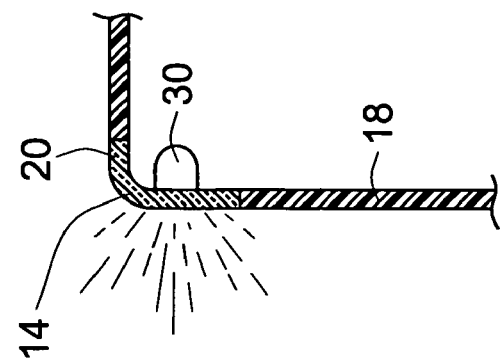
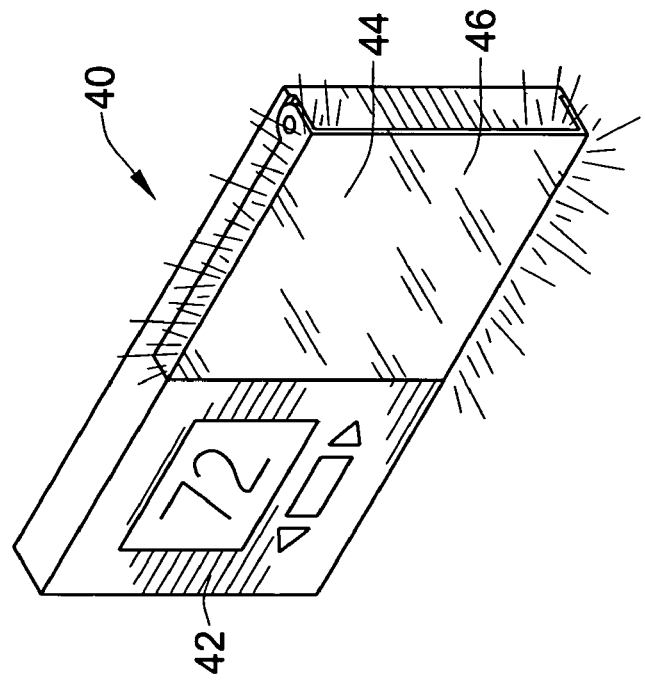
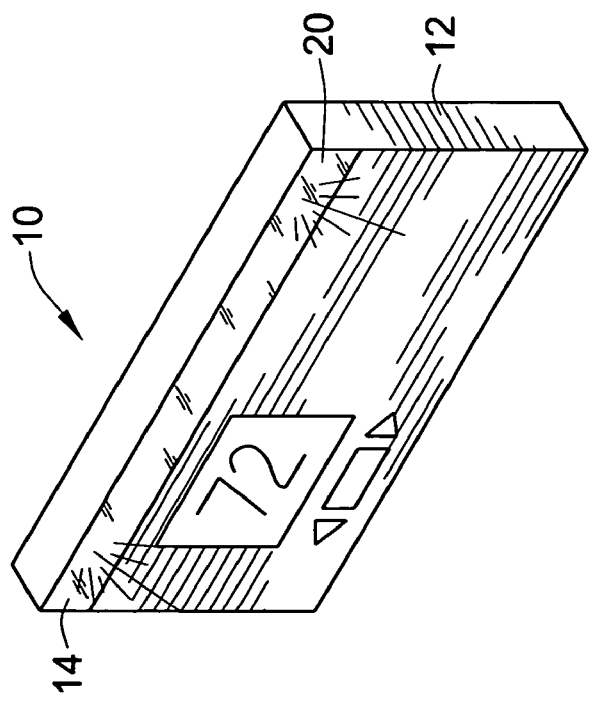

COLOR CHANGING THERMOSTATIC CONTROLLER

FIELD OF THE INVENTION

This invention relates to heating, ventilation and air conditioning (HVAC) systems, and more particularly to a thermostatic control unit, such as a wall mounted thermostat, or a temperature indicating device such as a thermometer, or other types of temperature responsive devices of the type used in HVAC systems.

BACKGROUND OF THE INVENTION

Most HVAC systems used for providing temperature control of architectural spaces include a thermostatic controller, such as a thermostat, that is mounted on the wall of the space, for controlling the temperature of the space. Such thermostatic controllers typically include an internal temperature sensitive element for sensing the present room temperature of the space, an input element for receiving an input designating a desired room temperature, and a dial or digital display that can be viewed by a person operating the controller. Alternatively, such controllers are sometimes adapted to receive a present room temperature and/or a desired temperature signal from a sensor or input element located in the space at a point remote from the controller. A typical controller may also include output elements such as relays, switches, or electronic drive circuits for sending a control signal to the HVAC system.

Sometimes the dial or digital display of the thermostatic controller is illuminated, or can be lighted by pressing a button on the controller, so that the dial or display can be seen more clearly. Although such an illumination feature facilitates operation of the thermostatic controller, it is still typically necessary to be standing in very close proximity to the controller in order to read the dial or display to view the information displayed thereon. It is desirable to have a method and apparatus for visually indicating the present room temperature and in a manner that does not require a person to be standing in close proximity to the controller. This is particularly true for persons who have difficulty in walking, or who have impaired vision.

Prior approaches to providing a visual indication of the present room temperature, on the dial or display of a thermostatic controller, have also not been aesthetically pleasing. Permanently illuminated dials or displays are distracting, and are generally totally utilitarian in nature. Having a lighted display indicating the present temperature in numerals that are big enough to be viewed from a point even a foot or two away from the controller is generally neither practical nor aesthetically pleasing.

It is desirable, therefore, to have an improved method and apparatus for providing a visual indication of present room temperature on a thermostatic controller, in a manner that can be viewed at some distance from the controller, and in a manner that is aesthetically pleasing.

BRIEF SUMMARY OF THE INVENTION

The invention provides an apparatus and method for visually displaying the present room temperature of a space, through the use of a thermostatic controller adapted for receiving a temperature input indicative of a temperature in a space, and having a housing that includes an illuminated portion thereof emitting a light having a characteristic of the light that changes as a function of the temperature in the space. In various forms of the invention, characteristics of the light, such as the color or the intensity of the light, are changed as a function of the temperature in the space, to provide a visual indication indicative of the present room temperature of the space.

Some forms of the invention include an input device, such as a knob, push button, or key pad, for providing a desired temperature input to the thermostatic controller, and the characteristic of the light is changed in a predetermined manner as the temperature in the space varies with respect to the desired temperature.

In one form of the invention, a thermostatic controller, adapted for receiving a temperature input indicative of a temperature in a space, includes a housing having at least a portion thereof illuminated by a light that changes color as a function of the temperature in the space. The thermostatic controller may also include an input device for providing a desired temperature input to the thermostatic controller, with the illuminated portion of the housing changing color in a predetermined manner as the temperature in the space varies with respect to the desired temperature. The thermostatic controller may further include a temperature sensitive element for sensing the temperature, with the temperature sensitive element being operatively connected to the illuminated portion of the housing in a manner causing the housing to change color as a function of the temperature as sensed by the temperature sensing element.

A thermostatic controller, according to the invention, may further include one or more light emitting elements operatively attached to both the illuminated portion of the housing and the temperature sensitive element, with the light emitting elements emitting light of varying colors as a function of the temperature. The housing may include a translucent portion thereof that is illuminated by one or more of the light emitting elements. The housing may further include a light pipe apparatus operatively connecting one or more of the light emitting elements to the translucent portion of the housing.

A thermostatic controller, according to the invention, may further include a processor operatively connected to the temperature sensitive element and to one or more of the light emitting elements, for controlling one or more of the light emitting elements as a function of the temperature sensed by the temperature sensing element. The thermostatic controller may also include an input device for providing a desired temperature input to the processor. The processor may control the light emitting elements in such a manner that the illuminated portion of the housing changes color in a predetermined manner as the temperature sensed by the temperature sensitive element varies with respect to the desired temperature.

The invention may also take the form of a method for operating a thermostatic controller including a housing having at least a portion thereof emitting a light having a characteristic of the light. The method may include sensing a temperature in a space, and changing the characteristic of the light emitted by the housing as a function of the temperature in the space. Where the characteristic of the light is the color of the light, the method may include changing the color of the light as a function of the temperature in the space. Where the characteristic of the light is the intensity of the light, the method may include changing the intensity of the light as a function of the temperature in the space. The method may further include providing a desired temperature input to the thermostatic controller, and changing the characteristic of the light emitted by the housing in a predetermined manner as the temperature in the space varies with respect to the desired temperature.

Other aspects, objectives and advantages of the invention will be apparent from the following detailed description and the accompanying drawings.

BRIEF DESCRIPTION OF THE DRAWINGS

FIG. 1 is a perspective view of a first exemplary embodiment of a thermostatic controller, according to the invention.

FIG. 3 is a cross-sectional representation of a portion of the housing of the thermostatic controller of FIGS. 1 and 2, taken along line 3-3 in FIG. 2.

FIG. 4 is a perspective illustration of a second exemplary embodiment of a thermostatic controller, according to the invention.

DETAILED DESCRIPTION OF THE INVENTION

Figure 2:
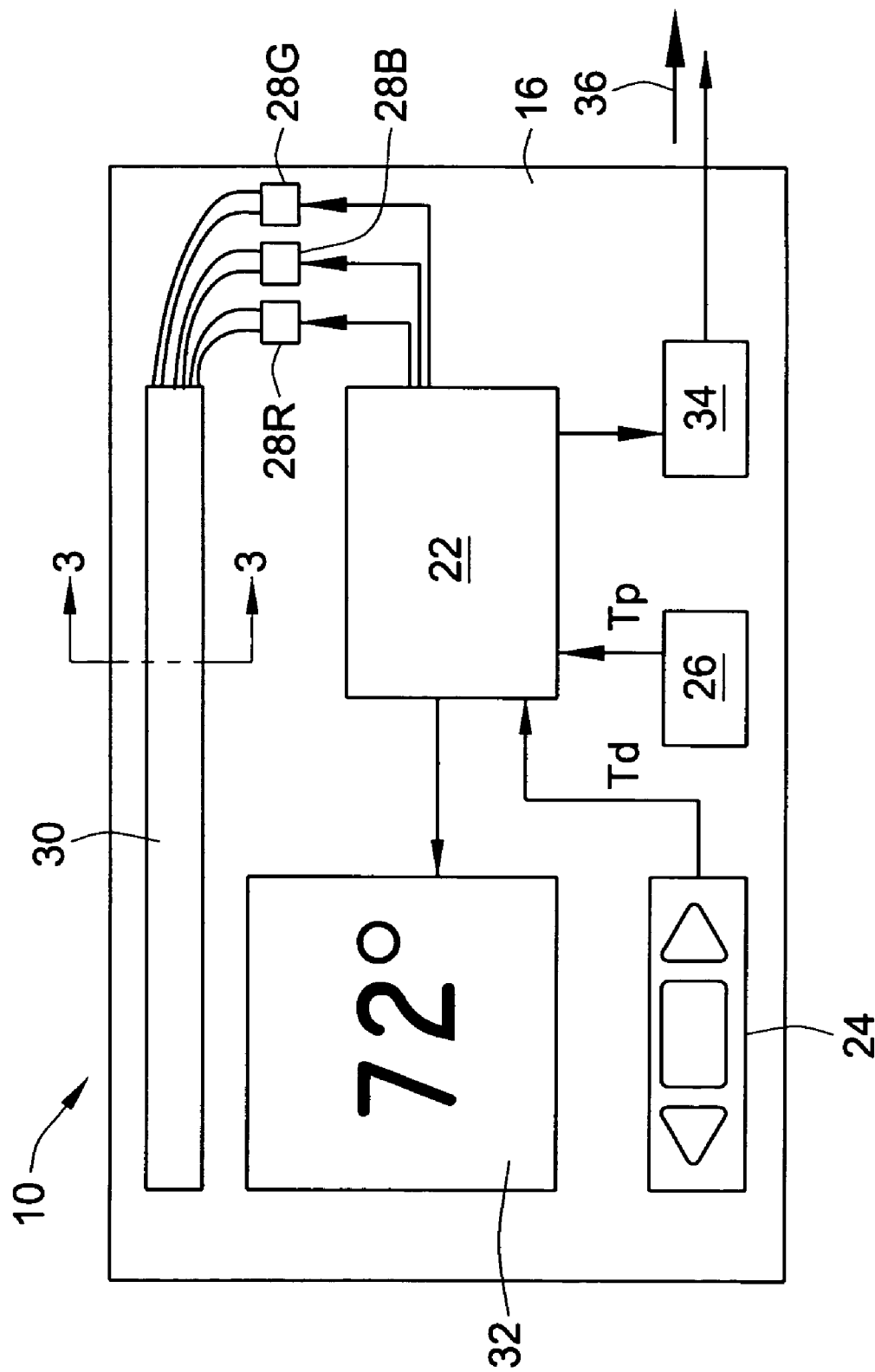
FIG. 2 is a schematic representation of the internal construction of the exemplary embodiment of the thermostatic controller of FIG. 1.

FIGS. 1-3 show a first embodiment of a thermostatic controller, according to the invention, in the form of a wall mounted thermostat 10. The thermostat 10 is adapted for receiving a temperature input indicative of a temperature in a space, and includes a housing 12 having a portion 14 thereof illuminated by a light that changes color as a function of the temperature in the space. Other characteristics of the light illuminating the portion 14 of the housing 12, such as the intensity or the duration of the illumination, may also be changed as a function of the temperature in the space.

As shown in FIGS. 2 and 3, the housing 12 of the thermostat 10 includes a base 16 adapted for attaching the thermostat 10 to a wall of the space, and a cover 18 which attaches to the base 16. The cover 18 of the housing 12 includes a translucent portion 20 thereof which constitutes the illuminated portion 14 of the housing 12 in the first exemplary embodiment, as shown in FIGS. 1-3. The translucent portion 20 in the exemplary embodiment of FIGS. 1-3 extends horizontally along an upper corner of the housing 12 of the thermostat 10. In other embodiments of the invention, other portions of the housing 12, or even the entire housing 12 could form an illuminated portion 14 of the housing 12.

As shown in FIG. 2, the exemplary embodiment of the thermostat 10 includes a processor 22, an input element 24, a temperature sensitive element 26, and three light emitting elements 28R, 28G, 28B. In the exemplary embodiment, the three light emitting elements 28R, 28G, 28B, are light emitting diodes, but in other embodiments of the invention, other types of light emitting elements could be used. The three light emitting elements 28R, 28G, 28B, are operatively connected to the translucent portion 20 of the cover 18, by a light pipe apparatus 30, as shown in FIGS. 2 and 3.

The exemplary embodiment of the thermostat 10 also includes a display 32 and an output driver circuit 34. The input element 24 is a keypad device including several buttons which can be used in conjunction with the display 32 for providing a desired temperature input $T_d$ to the processor 22. The temperature sensitive element 26 senses the present room temperature of the space and provides a signal indicative $T_p$ of the present room temperature to the processor 22. The processor 22 compares the present room temperature to the desired room temperature, and causes the output driver circuit 34 to generate an output signal 36 for controlling a heating, ventilating and air conditioning (HVAC) system in a conventional manner.

The processor 22 also controls the three light emitting elements 28R, 28B, 28G, as a function of the present temperature $T_p$ with respect to the desired temperature $T_d$ in such a manner that the light emitting elements 28R, 28G, 28B, in combination, generate a color of light in accordance with a predetermined relationship between the desired temperature $T_d$ and the present room temperature $T_p$. The combined light output of the light emitting elements 28R, 28G, 28B is transmitted through the light pipe apparatus 30 to the translucent portion 20 of the housing 12, and emitted as a visible indicator of the relative relationship of the current room temperature $T_p$ to the desired temperature $T_d$.

In the exemplary embodiment of the thermostat 10, it is contemplated, for example, that when the current room temperature $T_p$ is below the desired temperature $T_d$ that the processor 22 would control the light emitting elements 28R, 28G, 28B to produce a blue color in the illuminated portion 14 of the housing 12. It is further contemplated that the farther that the current room temperature $T_p$ is below the desired room temperature $T_d$, the deeper the blue color may become, or that the intensity of the blue color might also be changed to indicate how far the current room temperature $T_p$ is from the desired room temperature $T_d$. In similar fashion, it is contemplated, for example, that when the current room temperature $T_p$ is above the desired $T_d$ temperature, the processor 22 might control the light emitting elements 28R, 28G, 28B to produce a red illumination from the illuminated portion 14 of the housing, with the shade of red and/or the intensity of the red color being varied as an indication of how far the present $T_p$ room temperature is above the desired room temperature $T_d$.

Those having skill in the art will recognize from the foregoing description, that the invention provides a method and apparatus for visually communicating the current temperature of a room as either an absolute value, or with reference to a desired temperature of the room.

Those skilled in the art will also readily recognize that, although the invention has been described herein with respect to certain exemplary embodiments, many variations are possible and contemplated within the scope of the invention. For example, although the first exemplary embodiment described above generated an illuminated display having a color indicating how far the present room temperature was above or below a desired temperature, in other embodiments of the invention, it may be desirable to have the illuminated portion 14 of the housing 12 change color or in intensity as a simple function of the present room temperature alone. It may also be desirable in other embodiments of the present invention to use fewer or more light emitting elements of a different type than the three LEDs 28R, 28G, 28B shown in the first exemplary embodiment of the thermostat 10 as described above. The light emitting elements of the exemplary embodiment were also illustrated as being a red, a green, and a blue LED connected in parallel through the light pipe apparatus 30 to generated a virtually infinite palette of shades of color in the illuminated portion 14 of the housing 12. In other embodiments of the invention, it may be desirable to use LEDs having several elements combined in a single housing, or a single LED generating a single color of light with the intensity of the light being controlled by the processor 22 to create a visual indication in the illuminated portion 14 of the housing 12, which changes as a function of the present temperature $T_p$ of the space. Those having skill in the art will further recognize the invention can be practiced in many other forms than the first exemplary embodiment shown in FIGS. 1-3. For example, in a second exemplary embodiment of a thermostat 40, according to the invention, the housing 42 includes a hinged door 44, of a translucent material, which forms the illuminated portion 46 of the housing 42. One or more light emitting elements (not shown) are attached to the housing 42 behind the hinged door 44, and controlled in a manner similar to that described with respect to the first exemplary embodiment of FIGS. 1-3 to generate a visual indication of the room temperature by varying a characteristic such as the color or intensity of the light emitted by the hinged door 44 of the thermostat 40.

It is further contemplated that an apparatus according to the invention, might be operated in other ways than those expressly described herein, for producing a purely aesthetic effect, or communicating other information relating to the proper functioning of an HVAC system controlled by an apparatus in accordance with the invention. For example, the illuminated portion of a thermostatic controller according to the invention might be made to flash briefly when the controller sends a signal to the HVAC system commanding either heating or cooling of the space.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermostatic controller adapted for receiving a temperature input indicative of a temperature in a space, the controller comprising a housing having a translucent portion thereof illuminated by a light that changes color as a function of the temperature in the space;
   a temperature sensitive element for sensing the temperature, the temperature sensitive element being operatively connected to the illuminated translucent portion of the housing for causing the housing to change color as a function of the temperature as sensed by the temperature sensing element;
   one or more light emitting elements operatively attached to both the illuminated translucent portion of the housing and the temperature sensitive element and emitting light of varying colors as a function of the temperature;
   wherein the translucent portion thereof is illuminated by the one or more light emitting elements; and
   a light pipe apparatus operatively connecting the one or more light emitting elements to the translucent portion of the housing.

2. A thermostatic controller adapted for receiving a temperature input indicative of a temperature in a space, the controller comprising a housing having a translucent portion thereof illuminated by a light that changes color as a function of the temperature in the space;
   a temperature sensitive element for sensing the temperature, the temperature sensitive element being operatively connected to the illuminated translucent portion of the housing for causing the housing to change color as a function of the temperature as sensed by the temperature sensing element;
   one or more light emitting elements operatively attached to both the illuminated translucent portion of the housing and the temperature sensitive element and emitting light of varying colors as a function of the temperature;
   a processor operatively connected to the temperature sensitive element and to the one or more light emitting elements, for controlling one or more of the one or more light emitting elements as a function of the temperature sensed by the temperature sensitive element;
   an input device for providing a desired temperature input to the processor;
   wherein the illuminated translucent portion of the housing changes color in a predetermined manner as the temperature sensed by the temperature sensitive element varies with respect to the desired temperature and the translucent portion thereof is illuminated by the one or more light emitting elements; and
   a light pipe apparatus operatively connecting the one or more light emitting elements to the translucent portion of the housing.

3. A method for operating a thermostatic controller adapted for receiving a temperature input indicative of a temperature in a space and having a housing including an illuminated translucent portion thereof, the method comprising, changing the color of the illuminated portion the housing as a function of the temperature in the space;
   providing a desired temperature input to the thermostatic controller; and changing the color of the illuminated translucent portion of the housing in a predetermined manner as the temperature in the space varies with respect to the desired temperature;
   a temperature sensitive element for sensing the temperature, and the method further comprises: operatively connecting the temperature sensitive element to the housing for causing the illuminated translucent portion of the housing to change color as a function of the temperature as sensed by the temperature sensing element;
   one or more light emitting elements operatively attached to both the illuminated translucent portion of the housing and the temperature sensitive element, and the method further comprises, emitting light of varying colors from the light emitting elements as a function of the temperature input;
   illuminating the translucent portion of the housing with one or more of the one or more light emitting elements; and
   wherein the thermostatic controller further includes a light pipe apparatus, and the method further comprises, operatively connecting the one or more of the one or more light emitting elements to the translucent portion of the housing with the light pipe apparatus.

* * * * *